(12) United States Patent
Pang et al.

(10) Patent No.: US 11,612,926 B2
(45) Date of Patent: Mar. 28, 2023

(54) LOW DENSITY PRESS-HARDENING STEEL HAVING ENHANCED MECHANICAL PROPERTIES

(71) Applicant: GM GLOBAL TECHNOLOGY OPERATIONS LLC, Detroit, MI (US)

(72) Inventors: Jiachen Pang, Shenyang (CN); Qi Lu, Shanghai (CN); Jianfeng Wang, Nanjing (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 51 days.

(21) Appl. No.: 17/251,655

(22) PCT Filed: Jun. 19, 2018

(86) PCT No.: PCT/CN2018/091751
§ 371 (c)(1),
(2) Date: Dec. 11, 2020

(87) PCT Pub. No.: WO2019/241902
PCT Pub. Date: Dec. 26, 2019

(65) Prior Publication Data
US 2021/0276065 A1    Sep. 9, 2021

(51) Int. Cl.
*B21D 22/02* (2006.01)
*C21D 1/673* (2006.01)
(Continued)

(52) U.S. Cl.
CPC ............. *B21D 22/022* (2013.01); *C21D 1/19* (2013.01); *C21D 1/673* (2013.01); *C21D 1/76* (2013.01);
(Continued)

(58) Field of Classification Search
None
See application file for complete search history.

(56) References Cited

U.S. PATENT DOCUMENTS 1,828,325 A    10/1931    Kurz
2,178,281 A    10/1939    Judge
(Continued)

FOREIGN PATENT DOCUMENTS

CA    2378934 A1    9/2003
CN    101270453 A    9/2008
(Continued)

OTHER PUBLICATIONS

Second Office Action for Chinese Patent Application No. 2020106261153.2 dated Mar. 9, 2022, with correspondence dated Mar. 14, 2022, from China Patent Agent (H.K.) Ltd summarizing contents; 12 pages.
(Continued)

*Primary Examiner* — Anthony M Liang
(74) *Attorney, Agent, or Firm* — Harness, Dickey & Pierce, P.L.C.

(57) ABSTRACT

A method of forming a shaped steel object is provided. The method includes cutting a blank from an alloy composition including 0.05-0.5 wt. % carbon, 4-12 wt. % manganese, 1-8 wt. % aluminum, 0-0.4 wt. % vanadium, and a remainder balance of iron. The method also includes heating the blank until the blank is austenitized to form a heated blank, transferring the heated blank to a press, forming the heating blank into a predetermined shape to form a stamped object, and decreasing the temperature of the stamped object to a temperature between a martensite start (Ms) temperature of the alloy composition and a martensite final (Mf) temperature of the alloy composition to form a shaped steel object comprising martensite and retained austenite.

13 Claims, 7 Drawing Sheets

(51) Int. Cl.
  *C21D 1/19* (2006.01)
  *C21D 1/76* (2006.01)
  *C22C 38/14* (2006.01)
  *C22C 38/12* (2006.01)
  *C22C 38/06* (2006.01)
  *C22C 38/04* (2006.01)
  *C21D 6/00* (2006.01)

(52) U.S. Cl.
  CPC .............. *C21D 6/005* (2013.01); *C22C 38/04* (2013.01); *C22C 38/06* (2013.01); *C22C 38/12* (2013.01); *C22C 38/14* (2013.01); *C21D 2211/001* (2013.01); *C21D 2211/008* (2013.01)

(56) References Cited

U.S. PATENT DOCUMENTS

| | | |
|---|---|---|
| 3,111,436 A | 11/1963 | McGavin |
| 3,330,705 A | 7/1967 | Madrzyk et al. |
| 3,340,102 A | 9/1967 | Kulin et al. |
| 3,516,874 A | 6/1970 | Maker et al. |
| 3,907,614 A | 9/1975 | Bramfitt et al. |
| 4,086,104 A | 4/1978 | Kinoshita et al. |
| 4,146,411 A | 3/1979 | Dewsnap et al. |
| 4,327,156 A | 4/1982 | Dillon et al. |
| 4,486,248 A | 12/1984 | Ackert et al. |
| 4,533,401 A | 8/1985 | Yutori et al. |
| 4,744,836 A | 5/1988 | Pfaffmann |
| 5,205,145 A | 4/1993 | Ishino et al. |
| 5,358,578 A | 10/1994 | Tischhauser |
| 5,554,233 A | 9/1996 | Heitmann et al. |
| 5,989,647 A | 11/1999 | Remy et al. |
| 6,270,594 B1 | 8/2001 | Bodnar et al. |
| 6,296,805 B1 | 10/2001 | Laurent et al. |
| 6,330,740 B1 | 12/2001 | Krempels |
| 6,364,972 B1 | 4/2002 | Bauer et al. |
| 6,564,604 B2 | 5/2003 | Kefferstein et al. |
| 7,166,372 B2 | 1/2007 | Bose et al. |
| 7,393,421 B2 | 7/2008 | Yang |
| 7,677,070 B2 | 3/2010 | Kobayashi |
| 7,703,312 B2 | 4/2010 | Walter |
| 7,727,337 B2 | 6/2010 | Sachdev et al. |
| 7,941,907 B2 | 5/2011 | Yang et al. |
| 8,007,923 B2 | 8/2011 | Sakakibara et al. |
| 8,141,230 B2 | 3/2012 | Brodt et al. |
| 8,252,125 B2 | 8/2012 | Giefers et al. |
| 8,440,323 B2 | 5/2013 | Spehner et al. |
| 8,614,008 B2 | 12/2013 | Canourgues et al. |
| 8,671,729 B2 | 3/2014 | Verma et al. |
| 8,733,142 B2 | 5/2014 | Spehner et al. |
| 8,778,261 B2 | 7/2014 | Nakamura et al. |
| 8,888,934 B2 | 11/2014 | Bian |
| 8,926,770 B2 | 1/2015 | Kobayashi et al. |
| 8,932,416 B2 | 1/2015 | Nakanishi et al. |
| 8,992,697 B2 | 3/2015 | Matsuda et al. |
| 9,359,663 B2 | 6/2016 | Mizuta et al. |
| 9,475,113 B2 | 10/2016 | Naitou et al. |
| 9,512,499 B2 | 12/2016 | Tomokiyo et al. |
| 9,534,268 B2 | 1/2017 | Ratte |
| 9,593,392 B2 | 3/2017 | John et al. |
| 9,598,745 B2 | 3/2017 | Hayashi et al. |
| 9,605,329 B2 | 3/2017 | Nonaka et al. |
| 9,611,518 B2 | 4/2017 | Naitou et al. |
| 9,617,624 B2 | 4/2017 | Tanahashi et al. |
| 9,644,247 B2 | 5/2017 | Matsuda et al. |
| 9,694,415 B2 | 7/2017 | Shan et al. |
| 9,725,782 B2 | 8/2017 | Nonaka et al. |
| 9,835,194 B2 | 12/2017 | Chiba et al. |
| 9,840,751 B2 | 12/2017 | Hayashi et al. |
| 9,850,554 B2 | 12/2017 | Naitou et al. |
| 9,896,736 B2 | 2/2018 | Tomokiyo et al. |
| 9,909,194 B2 | 3/2018 | Puerta Velasquez et al. |
| 9,920,407 B2 | 3/2018 | Nonaka et al. |
| 9,945,013 B2 | 4/2018 | Nonaka et al. |
| 10,029,294 B2 | 7/2018 | Yamano et al. |
| 10,030,280 B2 | 7/2018 | Hayashi et al. |
| 10,072,324 B2 | 9/2018 | Nonaka et al. |
| 10,260,121 B2 | 4/2019 | Lu et al. |
| 10,385,415 B2 | 8/2019 | Wang et al. |
| 10,472,691 B2 | 11/2019 | Köyer et al. |
| 10,619,223 B2 | 4/2020 | Wang |
| 10,822,681 B2 | 11/2020 | Schottler et al. |
| 2009/0155615 A1 | 6/2009 | Chen et al. |
| 2009/0238715 A1 | 9/2009 | Cho et al. |
| 2010/0026048 A1 | 2/2010 | Vlot et al. |
| 2010/0028190 A1 | 2/2010 | Wang |
| 2010/0269957 A1* | 10/2010 | Akerstrom .............. C21D 1/74 148/537 |
| 2011/0139308 A1 | 6/2011 | Peruzzi et al. |
| 2012/0211131 A1 | 8/2012 | Altschuler et al. |
| 2012/0267012 A1 | 10/2012 | Sohn et al. |
| 2013/0048161 A1 | 2/2013 | Matsuda et al. |
| 2013/0180969 A1 | 7/2013 | Cheng et al. |
| 2013/0186527 A1 | 7/2013 | Bradley |
| 2013/0199679 A1 | 8/2013 | Toji et al. |
| 2014/0020795 A1 | 1/2014 | Schwinghammer et al. |
| 2014/0057121 A1 | 2/2014 | Altschuler et al. |
| 2014/0065007 A1 | 3/2014 | Naitou et al. |
| 2014/0096876 A1 | 4/2014 | Matsuda et al. |
| 2014/0212687 A1 | 7/2014 | Vlot et al. |
| 2014/0261918 A1 | 9/2014 | Jin et al. |
| 2014/0322559 A1 | 10/2014 | Becker et al. |
| 2015/0020992 A1 | 1/2015 | Schottler et al. |
| 2015/0024237 A1 | 1/2015 | Tanahashi et al. |
| 2015/0082636 A1 | 3/2015 | Gruneklee et al. |
| 2015/0090377 A1 | 4/2015 | Murakami et al. |
| 2015/0114199 A1 | 4/2015 | Shepard et al. |
| 2015/0203946 A1 | 7/2015 | Hammer et al. |
| 2015/0225830 A1 | 8/2015 | Nonaka et al. |
| 2016/0010168 A1 | 1/2016 | Angles et al. |
| 2016/0017452 A1 | 1/2016 | Puerta Velasquez et al. |
| 2016/0047010 A1* | 2/2016 | Köyer .................... C21D 8/005 148/654 |
| 2016/0145707 A1 | 5/2016 | Feuser et al. |
| 2016/0145731 A1 | 5/2016 | Sachdev et al. |
| 2016/0147573 A1 | 5/2016 | Shayesteh et al. |
| 2016/0215376 A1 | 7/2016 | Luther et al. |
| 2016/0244855 A1 | 8/2016 | Steinebach et al. |
| 2016/0319389 A1 | 11/2016 | Hayashi et al. |
| 2017/0029913 A1 | 2/2017 | Bae et al. |
| 2017/0051372 A1 | 2/2017 | Tomokiyo et al. |
| 2017/0314088 A1 | 11/2017 | Wang |
| 2017/0314089 A1 | 11/2017 | Wang |
| 2017/0321294 A1 | 11/2017 | Arlazarov et al. |
| 2017/0342523 A1 | 11/2017 | Wang et al. |
| 2018/0030567 A1 | 2/2018 | Yi et al. |
| 2018/0216205 A1 | 8/2018 | Wang et al. |
| 2018/0223385 A1 | 8/2018 | Lu et al. |
| 2018/0237877 A1 | 8/2018 | Wang et al. |
| 2018/0237892 A1 | 8/2018 | Schottler et al. |
| 2018/0251875 A1 | 9/2018 | Pavlina |
| 2018/0312954 A1 | 11/2018 | Yasui et al. |
| 2019/0127829 A1 | 5/2019 | Santacreu et al. |
| 2020/0063232 A1 | 2/2020 | Lu et al. |
| 2020/0157665 A1 | 5/2020 | Lu et al. |
| 2020/0190611 A1 | 6/2020 | Lu et al. |
| 2020/0325552 A1 | 10/2020 | Mraczek et al. |
| 2021/0002746 A1 | 1/2021 | Lu et al. |
| 2021/0087661 A1 | 3/2021 | Lu et al. |
| 2021/0189531 A1 | 6/2021 | Lu et al. |
| 2021/0198760 A1 | 7/2021 | Lu et al. |
| 2021/0222265 A1 | 7/2021 | Lu et al. |

FOREIGN PATENT DOCUMENTS

| | | |
|---|---|---|
| CN | 101713046 A | 5/2010 |
| CN | 102031456 A | 4/2011 |
| CN | 102284523 A | 12/2011 |
| CN | 102644028 A | 8/2012 |
| CN | 102719783 A | 10/2012 |
| CN | 102758133 A | 10/2012 |
| CN | 102803519 A | 11/2012 |
| CN | 102828109 A | 12/2012 |
| CN | 102906291 A | 1/2013 |

(56) References Cited

FOREIGN PATENT DOCUMENTS

| | | |
|---|---|---|
| CN | 102912219 A | 2/2013 |
| CN | 103045950 A | 4/2013 |
| CN | 103108964 A | 5/2013 |
| CN | 103547687 A | 1/2014 |
| CN | 103556048 A | 2/2014 |
| CN | 103620075 A | 3/2014 |
| CN | 103842546 A | 6/2014 |
| CN | 104160050 A | 11/2014 |
| CN | 104160051 A | 11/2014 |
| CN | 104195455 A | 12/2014 |
| CN | 104379272 A | 2/2015 |
| CN | 104846274 A | 8/2015 |
| CN | 105026597 A | 11/2015 |
| CN | 105483531 A | 4/2016 |
| CN | 105648317 A | 6/2016 |
| CN | 105658821 A | 6/2016 |
| CN | 105671435 A | 6/2016 |
| CN | 105734413 A | 7/2016 |
| CN | 105886750 A | 8/2016 |
| CN | 106086683 A | 11/2016 |
| CN | 106399834 A | 2/2017 |
| CN | 106521338 A | 3/2017 |
| CN | 106906421 A | 6/2017 |
| CN | 106929755 A | 7/2017 |
| CN | 107002155 A | 8/2017 |
| CN | 107127238 A | 9/2017 |
| CN | 107338345 A | 11/2017 |
| CN | 107338349 A | 11/2017 |
| CN | 107354385 A | 11/2017 |
| CN | 107815612 A | 3/2018 |
| CN | 108359781 A | 8/2018 |
| CN | 110050084 A | 7/2019 |
| CN | 111542635 A | 8/2020 |
| CN | 112176245 A | 1/2021 |
| CN | 112513310 A | 3/2021 |
| CN | 112534078 A | 3/2021 |
| DE | 102009060388 A1 | 6/2011 |
| DE | 102012104734 A1 | 12/2013 |
| DE | 102015119417 A1 | 6/2016 |
| DE | 102017108835 A1 | 11/2017 |
| DE | 102017108837 A1 | 11/2017 |
| DE | 102018101735 A1 | 8/2018 |
| DE | 112016007444 T5 | 8/2019 |
| EP | 1878811 A1 | 1/2008 |
| EP | 1930450 B1 | 7/2011 |
| EP | 2524970 A1 | 11/2012 |
| EP | 3013988 A1 | 5/2016 |
| EP | 3020842 B1 | 5/2016 |
| EP | 2866147 B1 | 8/2016 |
| EP | 2719788 B1 | 11/2016 |
| EP | 3473735 A1 | 4/2019 |
| JP | H0384378 A | 4/1991 |
| JP | H09263886 A | 10/1997 |
| JP | 2000178640 A | 6/2000 |
| JP | 2003147486 A | 5/2003 |
| JP | 2003201549 A | 7/2003 |
| JP | 2005163123 A | 6/2005 |
| JP | 2006316309 A | 11/2006 |
| JP | 2007321168 A | 12/2007 |
| JP | 2008207279 A | 9/2008 |
| JP | 2008261023 A | 10/2008 |
| JP | 2010174302 A | 8/2010 |
| JP | 2011016149 A | 1/2011 |
| JP | 2011184768 A | 9/2011 |
| JP | 5015356 B2 | 8/2012 |
| JP | 2013204089 A | 10/2013 |
| JP | 2016125101 A | 7/2016 |
| KR | 20110034452 A | 4/2011 |
| KR | 20160057541 A | 5/2016 |
| SU | 711126 A1 | 2/1980 |
| WO | WO-2008102012 A1 | 8/2008 |
| WO | WO-2012120020 A1 | 9/2012 |
| WO | WO-2014024831 A1 | 2/2014 |
| WO | WO-2014037627 A1 | 3/2014 |
| WO | 2014128656 A1 | 8/2014 |
| WO | WO-2015102051 A1 | 7/2015 |
| WO | WO-2016079565 A1 | 5/2016 |
| WO | WO-2016095664 A1 | 6/2016 |
| WO | WO-2016106621 A1 | 7/2016 |
| WO | WO-2018107446 A1 | 6/2018 |
| WO | WO-2019085855 A1 | 5/2019 |
| WO | WO-2019127240 A1 | 7/2019 |
| WO | WO-2019222950 A1 | 11/2019 |
| WO | WO-2019241902 A1 | 12/2019 |

OTHER PUBLICATIONS

Lu, Qi et al, U.S. Appl. No. 16/958,362, filed Jun. 26, 2020 entitled, "Steel for Hot Stamping With Enhanced Oxidation Resistance," 41 pages.

Cao et al.; Oxidation Kinetics and Spallation Model of Oxide Scale during Cooling Process of Low Carbon Microalloyed Steel; Sep. 24, 2016; de Gruyter; High Temperature Materials and Processes vol. 36 Issue 9, p. 1-10 (Year: 2016).

Yi et al., Dual-phase hot press forming alloy, 2010, Elsevier, Materials Science and Engineering A, p. 4870-4874 (Year: 2010).

Lu, Qi et al., U.S. Appl. No. 17/153,848, filed Jan. 20, 2021 entitled "Press Hardening Steel With High Oxidation Resistance," 37 pages.

First Office Action for Chinese Patent Application No. 202010626153.2 dated Jun. 16, 2021 with correspondence dated Jun. 23, 2021 from China Patent Agent (H.K.) Ltd. summarizing contents, 10 pages.

Khanna, A.S., "Introduction to High Temperature Oxidation and Corrosion." ASM International, Materials Park, OH, p. 123 (2002).

First Office Action for Chinese Patent Application No. 201780098042.5 dated May 26, 2021 with English language machine translation, 20 pages.

Wang, Min et al., "Inverse evaluation of equivalent contact heat transfer coefficient in hot stamping of boron steel." The International Journal of Advanced Manufacturing Technology, vol. 87, pp. 2925-2932 (2016).

First Office Action for Chinese Patent Application No. 201880095869.5 dated Sep. 15, 2021 with correspondence dated Sep. 17, 2021 from China Patent Agent (H.K.) Ltd. summarizing contents, 9 pages.

U.S. Appl. No. 16/460,369, filed Jul. 2, 2019, Qi Lu et al.

Second Office Action for Chinese Patent Application No. 201780098042.5 dated Nov. 17, 2021, with correspondence dated Nov. 22, 2021, from China Patent Agent (H.K.) Ltd summarizing contents; 9 pages.

First Office Action for Chinese Patent Application No. 201880096658.3 dated Nov. 18, 2021, with correspondence dated Nov. 22, 2021, from China Patent Agent (H.K.) Ltd summarizing contents; 8 pages.

Altan, Taylan, "Hot-stamping boron-alloyed steels for automotive parts—Part I—Press Technology Tech Cell"; http://www.thefabricator.com/article/presstechnology/hot-stamping-boron-alloyed-steels-for-automotive-parts; Feb. 13, 2007; 3 pages.

Altan, Taylan, "Hot-stamping boron-alloyed steels for automotive parts—Part II—Press Technology Tech Cell"; http://www.thefabricator.com/article/presstechnology/hot-stamping-boron-alloyed-steels-for-automotive-parts-part-ii; Jan. 18, 2007; 2 pages.

Altan, Taylan, "Hot-stamping boron-alloyed steels for automotive parts—Part III—Press Technology Tech Cell"; http://www.thefabricator.com/article/presstechnology/hot-stamping-boron-alloyed-steels-for-automotive-parts-iii; Feb. 13, 2007; 2 pages.

Anonymous, "Process to improve oxidation resistance of press hardening steels," *Research Disclosure*, Database No. 641010 (Published online: Jul. 28, 2017), 2 pages.

Anonymous, "Steel Definitions, Today's AHSS for Automotive" *WorldAutoSteel*, [retrieved on Nov. 27, 2019]. Retrieved from the Internet: <URL: https://www.worldautosteel.org/steel-basics/automotive-steel-definitions/ <https://protect-us.mimecast.com/s/qVeXCADQNWCNqxzXcGLKQI>, 5 pages.

Anonymous, "Transformation-Induced Plasticity (TRIP) Steel" *WorldAutoSteel*, [retrieved on Nov. 27, 2019]. Retrieved from the Internet: <URL:https://www.worldautosteel.org/steel-basics/steel-types/transformation-induced-plasticity-trip-steel/>, 5 pages.

Anonymous, "TRIP steel" *Wikipedia*, [retrieved on Nov. 27, 2019], retrieved from the Internet: <URL: https://en.wikipedia.org/wiki/TRIP_steel>, 3 pages.

(56) References Cited

OTHER PUBLICATIONS

Davis, Joseph R. ed., "Dip, Barrier, and Chemical Conversion Coating," *Metals Handbook Desk Edition, ASM International*, 1998, p. 1154-1165 (Year: 1998).
Diekman, F. "Cold and Cryogenic Treatment of Steel," *ASM Handbook*, vol. 4A, *Steel Heat Treating Fundamentals and Processes*, pp. 382-386.
Dossett, John L. et al., "Practical Heat Treating," Second Edition (ASM International, 2006), pp. 7, 269. ISBN 1615031103 (Year: 2006).
First Office Action for Chinese Patent Application No. 201511036174.4 dated Feb. 28, 2017 with English language machine translation; 19 pages.
First Office Action for Chinese Patent Application No. 201680091625.0 dated Jul. 8, 2020 with English language machine translation, 11 pages.
First Office Action for Chinese Patent Application No. 201710222523.4 dated Apr. 27, 2018 and correspondence from China Patent Agent (H.K.) Ltd summarizing Office Action; 9 pages.
First Office Action for Chinese Patent Application No. 201710224443.2 dated May 3, 2018 and correspondence from China Patent Agent (H.K.) Ltd summarizing Office Action; 9 pages.
First Office Action for Chinese Patent Application No. 201810061046.2 dated Mar. 1, 2019 with English language machine translation; 18 pages.
First Office Action for German Patent Application No. 102015119417.1 dated Feb. 16, 2017; 5 pages.
First Office Action for German Patent Application No. 102017108835.0 dated Jul. 24, 2018 and correspondence dated Aug. 8, 2018 from Manitz Finsterwald Patentanwälte PartmbB summarizing contents; 6 pages.
First Office Action for German Patent Application No. 102017108837.7 dated Jul. 25, 2018 and correspondence from dated Aug. 8, 2018 Manitz Finsterwald Patentanwälte PartmbB summarizing contents; 6 pages.
First Office Action for German Patent Application No. 102018101735.9 dated May 3, 2019 with correspondence from Manitz Finsterwald Patentanwälte PartmbB summarizing contents, 6 pages.
Ghanbari, Zahra N. et al., "Zinc Coated Sheet Steel for Press Hardening (Master's Thesis)" Submitted to the Faculty and the Board of Trustees of the Colorado School of Mines, Fall 2014.
Grajcar, Adam et al.; "Phase Equilibrium and Austenite Decomposition in Advanced High-Strength Medium-Mn Bainitic Steels"; www.mdpi.com/journal/metals; Oct. 20, 2016; 14 pages.
International Search Report and Written Opinion for International Application No. PCT/CN2014/095753 dated Oct. 8, 2015; 8 pages (ISA/CN).
International Search Report and Written Opinion for International Application No. PCT/CN2016/110241 dated Sep. 25, 2017, 12 pages (ISA/CN).
International Search Report and Written Opinion for International Application No. PCT/CN2017/119484 dated Sep. 12, 2018, 9 pages (ISA/CN).
International Search Report and Written Opinion for International Application No. PCT/CN2018/088122 dated Feb. 26, 2019, 8 pages (ISA/CN).
International Search Report and Written Opinion for International Application No. PCT/CN2018/091751 dated Mar. 15, 2019, 9 pages (ISA/CN).
Karbasian, H. et al.; "A reviewon hot stamping"; Journal of Materials Processing Technology 210; Jul. 19, 2010; pp. 2103-2118.
Kurz, Thomas et al.; "Zinc Coated Press-Hardening Steel: Challenges and Solutions"; Voestalpine (Published Apr. 14, 2015), 12 pages.
Leonard, R. "Continuous Hot Dip Coatings," *Corrosion: Fundamentals, Testing, and Protection*, vol. 13A, ASM Handbook, *ASM International*, 2003, p. 786-796 (Year: 2003).
Liu, Hong-Sheng et al., "Hot Formation Quality of High Strength Steel BR1500HS for Hot Stamping without Cooling System," *Trans. Nonferrous Met. Soc. China* (2012), vol. 22, pp. s542-s547.
Lu, Qi et al., U.S. Appl. No. 16/460,369, filed Jul. 2, 2019 entitled, "Press Hardened Steel With Surface Layered Homogenous Oxide After Hot Forming," 50 pages.
Merklein, Marion et al., "A review on tailored blanks—Production, applications and evaluation," Journal of Materials Processing Technology (2014) 214, pp. 151-164; DOI: 10.1016/j.matprotec.2013.08.015 (Published online Sep. 6, 2013).
Mori, K. et al., "Warm and Hot Stamping of Ultra High Tensile Strength Steel Sheets Using Resistance Heating," CIRP Annals Manufacturing Technology (2005), vol. 54 (1), pp. 209-212.
Naderi, Malek et al., "Semi-hot Stamping as an Improved Process of Hot Stamping," *J. Mater. Sci. Technol.* (2011), vol. 27 (4) pp. 369-376.
Second Office Action for Chinese Patent Application No. 201511036174.4 dated Nov. 16, 2017 with English language machine translation; 15 pages.
Third Office Action for Chinese Patent Application No. 201511036174.4 dated Jul. 2, 2018 with English language machine translation; 26 pages.
Yi, H.L., "Dual-Phase Hot-Press Forming Alloy," Materials Science and Engineering A, 527 (2010). pp. 4870-4874.
Third Office Action for Chinese Patent Application No. 202010626153.2 dated Jun. 24, 2022, and correspondence from China Patent Agent (H.K.) Ltd summarizing Office Action; 22 pages.

\* cited by examiner

LOW DENSITY PRESS-HARDENING STEEL HAVING ENHANCED MECHANICAL PROPERTIES

CROSS REFERENCE TO RELATED APPLICATIONS

This application is a U.S. National Phase Application under 35 U.S.C. 371 of International Application No. PCT/CN2018/091751 filed on Jun. 19, 2018. The entire disclosure of the above application is incorporated herein by reference.

INTRODUCTION

This section provides background information related to the present disclosure which is not necessarily prior art.

Press-hardening steel (PHS), also referred to as "hot-stamped steel" or "hot-formed steel" is used in various industries and applications, including general manufacturing, construction equipment, automotive or other transportation industries, home or industrial structures, and the like. It is one of the strongest steels used for automotive body structural applications, having tensile strength properties on the order of about 1,500 mega-Pascal (MPa). Such steel has desirable properties, including forming steel components having high strength-to-weight ratios. For example, when manufacturing vehicles, especially automobiles, continual improvement in fuel efficiency and performance is desirable. PHS components are often used for forming load-bearing components, like door beams, which usually require high strength materials. Thus, the finished state of these steels are designed to have high strength and enough ductility to resist external forces such as, for example, resisting intrusion into the passenger compartment without fracturing so as to provide protection to the occupants. Moreover, galvanized PHS components may provide cathodic protection.

Many PHS processes involve austenitization in a furnace of a sheet steel blank, immediately followed by pressing and quenching of the sheet in dies. Austenitization is typically conducted in the range of about 880° C. to 950° C. There are two main types of PHS processes: indirect and direct. In the direct method, the PHS component is formed and pressed simultaneously between dies, which quenches the steel. In the indirect method, the PHS component is cold formed to an intermediate partial shape before austenitization and the subsequent pressing and quenching steps. The quenching of the PHS component hardens the component by transforming the microstructure from austenite to martensite. An oxide layer often forms during the transfer from the furnace to the dies when the PHS is not pre-coated or pre-treated with an anti-oxidation material. Therefore, after quenching, the oxide must be removed from the PHS component and the dies. The oxide is typically removed, i.e., descaled, by shot blasting.

The PHS component may be coated prior to applicable pre-cold forming (if the indirect process is used) or austenitization. Coating the PHS component provides a protective layer (e.g., galvanic protection or anti-oxidation protection) to the underlying steel component. Such coatings typically include an aluminum-silicon alloy for anti-oxidation protection and/or zinc for cathodic protection. Zinc coatings, for example, act as sacrificial layers and corrode instead of the steel component, even where the steel is exposed. Zinc coatings also generate oxides on PHS components' surfaces, which are removed by shot blasting. Accordingly, alloy compositions that do not require coatings and that provide improved strength and ductility are desired.

SUMMARY

This section provides a general summary of the disclosure, and is not a comprehensive disclosure of its full scope or all of its features.

In various aspects, the current technology provides a method of forming a shaped steel object. The method includes cutting a blank from an alloy composition. The alloy composition includes carbon (C) at a concentration of greater than or equal to about 0.05 wt. % to less than or equal to about 0.5 wt. % of the alloy composition, manganese (Mn) at a concentration of greater than or equal to about 4 wt. % to less than or equal to about 12 wt. % of the alloy composition, aluminum (Al) at a concentration of greater than or equal to about 1 wt. % to less than or equal to about 8 wt. % of the alloy composition, vanadium (V) at a concentration of greater than 0 wt. % to less than or equal to about 0.4 wt. % of the alloy composition, and a balance of the alloy composition being iron (Fe). The method also includes heating the blank until the blank is austenitized, transferring the heated blank to a press, forming the heated blank into a predetermined shape defined by the press to generate a stamped object, and decreasing the temperature of the stamped object to a temperature between a martensite start (Ms) temperature of the alloy composition and a martensite final (Mf) temperature of the alloy composition to form a shaped steel object including martensite and retained austenite.

In one aspect, the alloy composition further includes zirconium (Zr) at a concentration of greater than 0 wt. % to less than or equal to about 0.5 wt. % of the alloy composition.

In one aspect, the alloy composition further includes at least one of nickel (Ni) at a concentration of greater than 0 wt. % to less than or equal to about 5 wt. % of the alloy composition, molybdenum (Mo) at a concentration of greater than 0 wt. % to less than or equal to about 0.5 wt. % of the alloy composition, niobium (Nb) at a concentration of greater than 0 wt. % to less than or equal to about 0.2 wt. % of the alloy composition, copper (Cu) at a concentration of greater than 0 wt. % to less than or equal to about 3 wt. % of the alloy composition, titanium (Ti) at a concentration of greater than 0 wt. % to less than or equal to about 0.1 wt. % of the alloy composition, nitrogen (N) at a concentration of greater than 0 wt. % to less than or equal to about 0.01 wt. % of the alloy composition, and boron (B) at a concentration of greater than 0 wt. % to less than or equal to about 0.005 wt. % of the alloy composition.

In one aspect, the Mn is at a concentration of greater than or equal to about 6 wt. % to less than or equal to about 10 wt. % and the Al is at a concentration of greater than or equal to about 2 wt. % to less than or equal to about 5 wt. %.

In one aspect, the C is at a concentration of greater than or equal to about 0.1 wt. % to less than or equal to about 0.45 wt. %.

In one aspect, the alloy composition is in the form of a coil.

In one aspect, the heating the blank includes heating the blank to a temperature of greater than or equal to about 900° C. to less than or equal to about 950° C. for a time period of greater than or equal to about 1 minute to less than or equal to about 60 minutes.

In one aspect, the temperature between the Ms temperature of the alloy composition and the Mf temperature of the alloy composition is ambient temperature.

In one aspect, the decreasing the temperature includes decreasing the temperature at a rate of greater than or equal to about 5° Cs$^{-1}$ to less than or equal to about 300° Cs$^{-1}$.

In one aspect, the method further includes, prior to the heating the blank until the blank is austenitized, preoxidizing the alloy composition by heating the alloy composition to a temperature of greater than or equal to about 500° C. to less than or equal to about 600° C. for a time period of greater than or equal to about 1 minute to less than or equal to about 60 minutes.

In one aspect, the method further includes, after the decreasing the temperature, tempering the shaped steel object.

In one aspect, the tempering the shaped steel object includes heating the shaped steel object to a temperature greater than or equal to about 150° C. to less than or equal to about 300° C. for a time period of greater than or equal to about 1 minute to less than or equal to about 120 minutes, and cooling the shaped steel object to ambient temperature.

In one aspect, the shaped steel object has a higher strength and a lower weight relative to an equivalent shaped steel object formed from 22MnB5.

In various embodiments, the current technology also provides a method of forming a shaped steel object. The method includes heating a blank to a temperature of greater than or equal to about 900° C. to less than or equal to about 950° C. for a time period of greater than or equal to about 1 minute to less than or equal to about 60 minutes to generate a heated blank. The blank is composed of an alloy composition including carbon (C) at a concentration of greater than or equal to about 0.05 wt. % to less than or equal to about 0.5 wt. % of the alloy composition, manganese (Mn) at a concentration of greater than or equal to about 4 wt. % to less than or equal to about 12 wt. % of the alloy composition, aluminum (Al) at a concentration of greater than or equal to about 1 wt. % to less than or equal to about 8 wt. % of the alloy composition, vanadium (V) at a concentration of greater than 0 wt. % to less than or equal to about 0.4 wt. % of the alloy composition, zirconium (Zr) at a concentration of greater than 0 wt. % to less than or equal to about 0.5 wt. % of the alloy composition, and a balance of the alloy composition being iron (Fe). The method also includes forming the heated blank into a predetermined shape in a press to generate a stamped object, quenching the stamped object by decreasing the temperature of the stamped object to about ambient temperature to form a shaped steel object including martensite and retained austenite, and tempering the shaped steel object by heating the shaped steel object to greater than or equal to about 150° C. to less than or equal to about 300° C. for a time period of greater than or equal to about 1 minute to less than or equal to about 120 minutes and then decreasing the temperature of the shaped steel object to ambient temperature.

In one aspect, the shaped steel object is an automobile part selected from the group consisting of a pillar, a bumper, a roof rail, a rocker rail, a tunnel, a beam, and a reinforcement.

In various embodiments, the current technology yet further provides an alloy composition. The alloy composition includes carbon (C) at a concentration of greater than or equal to about 0.05 wt. % to less than or equal to about 0.5 wt. % of the alloy composition, manganese (Mn) at a concentration of greater than or equal to about 4 wt. % to less than or equal to about 12 wt. % of the alloy composition, aluminum (Al) at a concentration of greater than or equal to about 1 wt. % to less than or equal to about 8 wt. % of the alloy composition, vanadium (V) at a concentration of greater than 0 wt. % to less than or equal to about 0.4 wt. % of the alloy composition, zirconium (Zr) at a concentration of greater than 0 wt. % to less than or equal to about 0.5 wt. % of the alloy composition, and a balance of the alloy composition being iron (Fe).

In one aspect, the alloy composition has a higher strength and lower weight after press hardening relative to an equivalent 22MnB5 steel after press hardening.

In one aspect, after press hardening, the alloy composition includes greater than or equal to about 80 wt. % to less than or equal to about 95 wt. % martensite and greater than or equal to about 5 wt. % to less than or equal to about 20 wt. % retained austenite.

In one aspect, after press hardening, the alloy composition has a martensite:retained austenite ratio that increases when a load is applied to the alloy composition.

In one aspect, the current technology provides an automobile part including the alloy composition. The automobile part is a pillar, a bumper, a roof rail, a rocker rail, a tunnel, a beam, or a reinforcement.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

Figure 1:
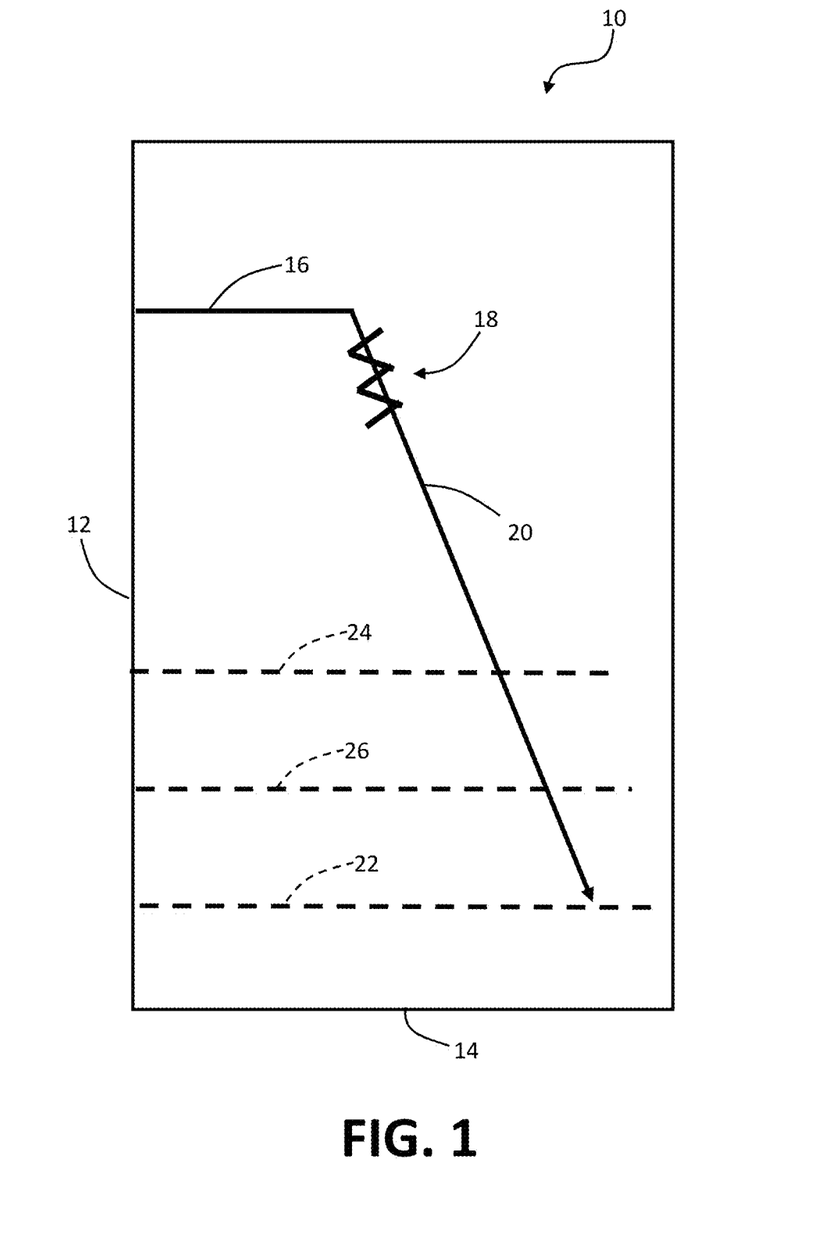
FIG. 1 is a graph showing a temperature profile used in a method of hot stamping 22MnB5 steel.

22MnB5 is a press-hardening steel (PHS) that is used for manufacturing various automobile parts. 22MnB5 comprises about 0.22 wt. % carbon (C), about 1.2 wt. % manganese (Mn), about 0.05 wt. % aluminum (Al), about 0.033 wt. % titanium (Ti), about 0.003 wt. % boron (B), and about 0.006 wt. % nitrogen (N). 22MnB5 steel can be hot stamped as a bare uncoated alloy. When uncoated, hot stamped 22MnB5 undergoes oxidation, which must be removed in a subsequent cleaning or descaling process. Therefore, 22MnB5 is often coated with aluminum-silicon (Al—Si) or zinc (Zn) to minimize oxidation and to preclude a subsequent cleaning process. FIG. 1 shows a temperature profile 10 for hot stamping 22MnB5. The temperature profile 10 has a y-axis 12 representing temperature and an x-axis 14 representing time. As shown in the temperature profile 10, 22MnB5 is heated to an austenitization temperature 16 where the 22MnB5 becomes fully austenitized. The 22MnB5 is then formed into a shape at a forming temperature 18 and a decreasing temperature 20 quenches the 22MnB5, until the 22MnB5 reaches ambient temperature 22. Because 22MnB5 has a martensite start (Ms) temperature 24 of about 425° C. and a martensite final (Mf) temperature 26 of about 280° C., when the 22MnB5 reaches ambient temperature 22, the 22MnB5 has a microstructure that is about 100% martensite. The resulting hot pressed steel has an ultimate tensile strength (UTS) of less than about 1500 MPa and a density of about 7.8 g/cm$^3$.

The current technology provides an alloy composition that, after hot pressing, has a higher UTS and a lower density relative to hot pressed 22MnB5. The alloy composition can be used to manufacture any object that is generally made by hot stamping, such as, for example, a vehicle part. Non-limiting examples of vehicles that have parts suitable to be produced by the current method include bicycles, automobiles, motorcycles, boats, tractors, buses, mobile homes, campers, gliders, airplanes, and military vehicles, such as tanks. For example, the alloy composition can be used for automobile parts, such as pillars (e.g., A-pillars and B-pillars), bumpers (e.g., front bumpers and rear bumpers), roof rails, rocker rails, tunnels, beams (e.g., side impact beams), or reinforcements (e.g., door reinforcements).

The alloy composition of the current technology comprises carbon (C) and manganese (Mn) at concentrations that are generally higher than their corresponding concentrations in 22MnB5 steel. These C and Mn concentrations provide a hot stamped steel comprising martensite and retained austenite, which lead to improved UTS and ductility. More particularly, the alloy composition comprises carbon (C) at a concentration of greater than or equal to about 0.05 wt. % to less than or equal to about 0.5 wt. %, or greater than or equal to about 0.1 wt. % to less than or equal to about 0.45 wt. %, and manganese (Mn) at a concentration of greater than or equal to about 4 wt. % to less than or equal to about 12 wt. %, greater than or equal to about 5 wt. % to less than or equal to about 11 wt. %, or greater than or equal to about 6 wt. % to less than or equal to about 10 wt. %.

The alloy composition of the current technology also comprises aluminum (Al) at a concentration that is higher than the Al concentration in 22MnB5 steel. This increased Al concentration decreases the density of the resulting hot pressed steel and provides resistance to oxidation. In particular, the alloy composition comprises aluminum (Al) at a concentration of greater than or equal to about 1 wt. % to less than or equal to about 8 wt. %, or greater than or equal to about 2 wt. % to less than or equal to about 6 wt. %.

The alloy composition of the current technology also comprises vanadium (V), which is generally not present in 22MnB5 steel. The vanadium (V) refines the grain size of resulting hot pressed steel and inhibits or minimizes crack propagation, which improves ductility of the resulting hot pressed steel relative to 22MnB5 steel. In particular, the alloy composition comprises vanadium (V) at a concentration of greater than 0 wt. % to less than or equal to about 0.4 wt. %, or greater than or equal to about 0.01 wt. % to less than or equal to about 0.4 wt. %.

Under some conditions, the alloy composition is a solid solution comprising Al and nitrogen (N), which react and generate aluminum nitride (AlN) inclusion particles, which have a size of about 2-10 μm and decrease toughness. Relative to Al, zirconium (Zr) has a higher solubility in the solid solution. Zr reacts with N to form zirconium nitride (ZrN), which has a nanometer grain size and minimal effect on toughness. Therefore, by including Zr, ZrN may form, which minimizes the amount of AlN formed and mitigates the negative effect that AlN has on steel toughness. Accordingly, the alloy composition of the current technology also comprises zirconium (Zr) at a concentration of greater than 0 wt. % to less than or equal to about 0.5 wt. %, or greater than or equal to about 0.005 wt. % to less than or equal to about 0.2 wt. %.

A balance of the alloy composition is iron (Fe).

In various embodiments, the alloy composition further comprises titanium (Ti) at a concentration of greater than 0 wt. % to less than or equal to about 0.05 wt. %, or greater than or equal to about 0.001 wt. % to less than or equal to about 0.033 wt. %.

In various embodiments, the alloy composition further comprises boron (B) at a concentration of greater than 0 wt. % to less than or equal to about 0.005 wt. %, or greater than 0 wt. % to less than or equal to about 0.003 wt. %.

In various embodiments, the alloy composition further comprises nitrogen (N) at a concentration of greater than 0 wt. % to less than or equal to about 0.01 wt. %.

In various embodiments, the alloy composition further comprises molybdenum (Mo) at a concentration of greater than 0 wt. % to less than or equal to about 0.5 wt. %.

In various embodiments, the alloy composition further comprises niobium (Nb) at a concentration of greater than 0 wt. % to less than or equal to about 0.2 wt. %.

In various embodiments, the alloy composition further comprises nickel (Ni) at a concentration of greater than 0 wt. % to less than or equal to about 5 wt. %, greater than or equal to about 0.01 wt. % to less than or equal to about 3 wt. %, or less than or equal to about 3 wt. %.

In various embodiments, the alloy composition further comprises copper (Cu) at a concentration of greater than 0 wt. % to less than or equal to about 3 wt. %.

The alloy composition can include various combinations of C, Mn, Al, V, Zr, Ti, B, N, Mo, Nb, Ni, Cu, and Fe at their respective concentrations described above. In some embodiments, the alloy composition consists essentially of C, Mn, Al, V, Zr, Ti, B, N, Mo, Nb, Ni, Cu, and Fe. As described above, the term "consists essentially of" means the alloy composition precludes additional compositions, materials, components, elements, and/or features that materially affect the basic and novel characteristics of the alloy composition, such as strength and ductility, but any compositions, materials, components, elements, and/or features that do not materially affect the basic and novel characteristics, such as impurities, can be included.

In one embodiment, the alloy composition consists essentially of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, greater than 0 wt. % to less than or equal to about 0.1 wt. % Ti, greater than 0 wt. % to less than or equal to about 0.005 wt. % B, greater than 0 wt. % to less than or equal to about 0.01 wt. % N, greater than 0 wt. % to less than or equal to about 0.5 wt. % Mo, greater than 0 wt. % to less than or equal to about 0.2 wt. % Nb, greater than 0 wt. % to less than or equal to about 5 wt. % Ni, greater than 0 wt. % to less than or equal to about 3 wt. % Cu, and a remaining balance of Fe. In another embodiment, the alloy composition consists of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, greater than 0 wt. % to less than or equal to about 0.1 wt. % Ti, greater than 0 wt.

% to less than or equal to about 0.005 wt. % B, greater than 0 wt. % to less than or equal to about 0.01 wt. % N, greater than 0 wt. % to less than or equal to about 0.5 wt. % Mo, greater than 0 wt. % to less than or equal to about 0.2 wt. % Nb, greater than 0 wt. % to less than or equal to about 5 wt. % Ni, greater than 0 wt. % to less than or equal to about 3 wt. % Cu, and a remaining balance of Fe.

In one embodiment, the alloy composition consists essentially of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, and a remainder balance of Fe. In another embodiment, the alloy composition consists of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, and a remainder balance of Fe.

In one embodiment, the alloy composition consists essentially of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, greater than 0 wt. % to less than or equal to about 0.1 wt. % Ti, greater than 0 wt. % to less than or equal to about 0.005 wt. % B, greater than 0 wt. % to less than or equal to about 0.01 wt. % N, and a remainder balance of Fe. In another embodiment, the alloy composition consists of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, greater than 0 wt. % to less than or equal to about 0.1 wt. % Ti, greater than 0 wt. % to less than or equal to about 0.005 wt. % B, greater than 0 wt. % to less than or equal to about 0.01 wt. % N, and a remainder balance of Fe.

In one embodiment, the alloy composition consists essentially of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, greater than 0 wt. % to less than or equal to about 0.5 wt. % Mo, greater than 0 wt. % to less than or equal to about 0.2 wt. % Nb, greater than 0 wt. % to less than or equal to about 5 wt. % Ni, greater than 0 wt. % to less than or equal to about 3 wt. % Cu, and a remainder balance of Fe. In another embodiment, the alloy composition consists of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, greater than 0 wt. % to less than or equal to about 0.5 wt. % Mo, greater than 0 wt. % to less than or equal to about 0.2 wt. % Nb, greater than 0 wt. % to less than or equal to about 5 wt. % Ni, greater than 0 wt. % to less than or equal to about 3 wt. % Cu, and a remainder balance of Fe.

In one embodiment, the alloy composition consists essentially of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, greater than 0 wt. % to less than or equal to about 0.5 wt. % Mo, greater than 0 wt. % to less than or equal to about 5 wt. % Ni, greater than 0 wt. % to less than or equal to about 3 wt. % Cu, and a remainder balance of Fe. In another embodiment, the alloy composition consists of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Zr, greater than 0 wt. % to less than or equal to about 0.5 wt. % Mo, greater than 0 wt. % to less than or equal to about 5 wt. % Ni, greater than 0 wt. % to less than or equal to about 3 wt. % Cu, and a remainder balance of Fe.

In one embodiment, the alloy composition consists essentially of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Mo, greater than 0 wt. % to less than or equal to about 5 wt. % Ni, greater than 0 wt. % to less than or equal to about 3 wt. % Cu, and a remainder balance of Fe. In another embodiment, the alloy composition consists of greater than or equal to about 0.05 wt. % to less than or equal to about 0.5 wt. % C, greater than or equal to about 4 wt. % to less than or equal to about 12 wt. % Mn, greater than or equal to about 1 wt. % to less than or equal to about 8 wt. % Al, greater than 0 wt. % to less than or equal to about 0.4 wt. % V, greater than 0 wt. % to less than or equal to about 0.5 wt. % Mo, greater than 0 wt. % to less than or equal to about 5 wt. % Ni, greater than 0 wt. % to less than or equal to about 3 wt. % Cu, and a remainder balance of Fe.

In one embodiment, the alloy composition comprises C, Mn, Al, and Fe, and optionally comprises at least one of V, Zr, Ti, B, N, Mo, Nb, Ni, and Cu.

In one embodiment, the alloy composition comprises C, Mn, Al, V and Fe, and optionally comprises at least one of Zr, Ti, B, N, Mo, Nb, Ni, and Cu.

In one embodiment, the alloy composition comprises C, Mn, Al, Zr and Fe, and optionally comprises at least one of V, Ti, B, N, Mo, Nb, Ni, and Cu.

In one embodiment, the alloy composition comprises C, Mn, Al, V, Zr and Fe, and optionally comprises at least one of Ti, B, N, Mo, Nb, Ni, and Cu.

The alloy composition is provided as a rolled coil or as a sheet with a microstructure comprising ferrite and cementite. The alloy composition is either bare (uncoated) and preoxidized, bare and not preoxidized, or coated with Al—Si or Zn. For example, the alloy composition can be preoxidized during manufacturing at a steel mill and provided to a user as a bare, preoxidized coil or sheet. Alternatively, the alloy composition is not preoxidized during manufacturing and is provided to a user as a bare, non-preoxidized coil or sheet. When the alloy composition reaches a user in non-preoxidized form, the user optionally preoxidizes the alloy composition prior to hot stamping. Similarly, non-preoxidized alloy composition can be optionally coated during manufacturing.

Figure 2:
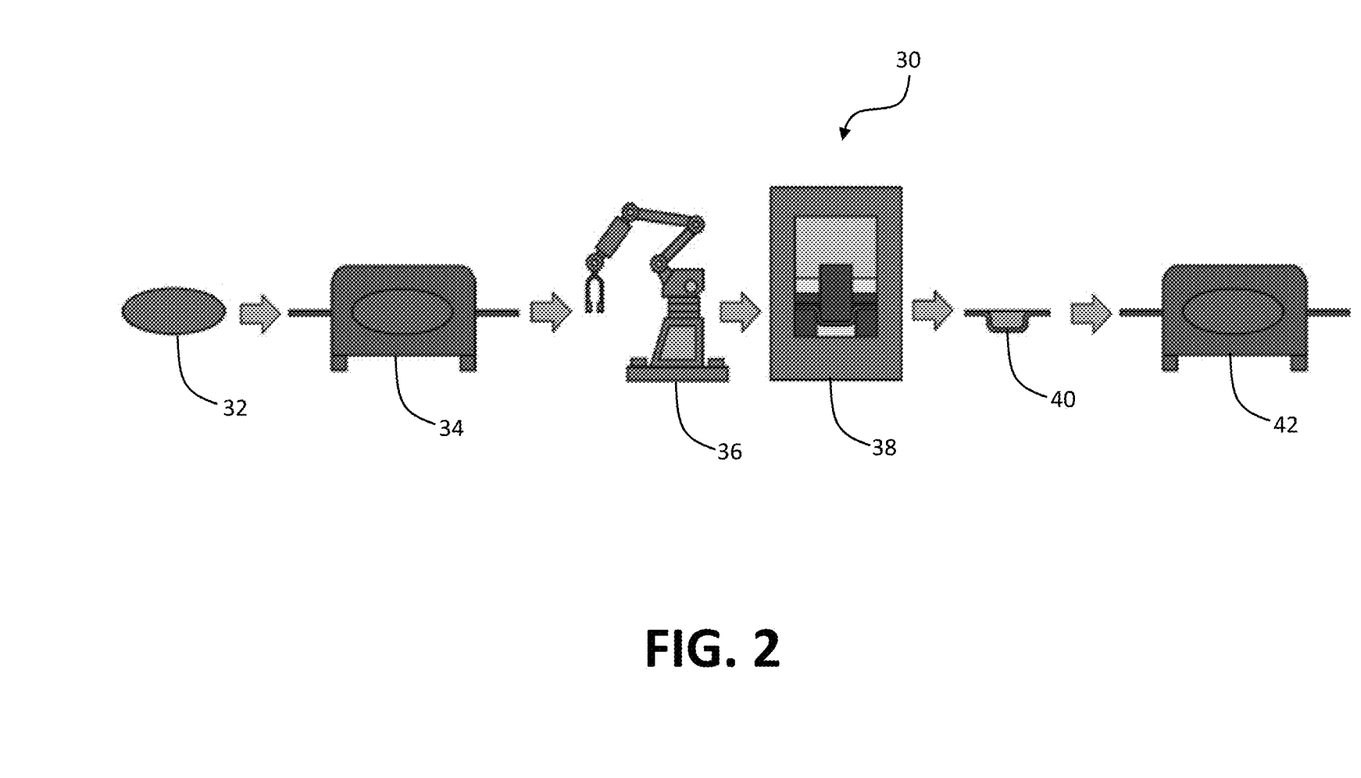
FIG. 2 is a flow chart showing aspects of a method for making a shaped steel object according to various aspects of the current technology.

With reference to FIG. 2, the current technology provides a method 30 of forming a shaped steel object. The shaped steel object can be any object that is generally made by hot stamping, as described above. The method 30 comprises cutting a blank 32 comprising an alloy composition, which can be provided as a coil or sheet. The alloy composition is optionally coated with, for example, Al—Si or Zn. The alloy composition is the alloy composition according to the current technology described herein. The method then comprises transferring the blank 32 to a furnace or oven 34, and austenitizing the blank 32 by heating the blank 32 to a temperature above a critical transformation temperature ($A_{c3}$), at which ferrite transforms into austenite, to generate a heated blank. Heating is performed until the blank is austenitized, i.e., until the blank comprises at least about 99% austenite or about 100% austenite. In various embodiments, the heating comprises heating the blank 32 to a temperature of greater than or equal to about 880° C. to less than or equal to about 1000° C., or greater than or equal to about 900° C. to less than or equal to about 950° C. The heating is performed for a time period of greater than or equal to about 0.5 minutes to less than or equal to about 60 minutes, or greater than or equal to about 1 minute to less than or equal to about 30 minutes.

Optionally by a robotic arm 36, the method 30 comprises transferring the heated blank to a press 38. Here, the method 30 comprises forming the heated blank into a predetermined shape defined by the press to form a stamped object. In various embodiments, the forming comprises stamping the heated blank to generate a stamped object having the predetermined shape.

While in the press 38, and optionally simultaneously with the forming, the method 30 also comprises quenching the stamped object to form a shaped steel object 40. The quenching comprises decreasing the temperature of the stamped object to a temperature between a martensite start (Ms) temperature of the alloy composition and a martensite final (Mf) temperature of the alloy composition to form the shaped steel object 40. The decreasing the temperature comprises decreasing the temperature at a rate of greater than or equal to about $5°$ $Cs^{-1}$ to less than or equal to about $300°$ $Cs^{-1}$. In various embodiments, the Ms temperature of the alloy composition is a temperature above ambient temperature and the Mf temperature of the alloy composition is a temperature below ambient temperature. As such, in some embodiments, the quenching comprises decreasing the temperature to ambient temperature. In other embodiments, the Ms temperature is below ambient temperature (e.g., when the alloy composition comprises 0.5 wt. % C and 12 wt. % Mn) or the Mf temperature is above ambient temperature (e.g., when the alloy composition comprises 0.05 wt. % C and 4 wt. % Mn). As used herein, "ambient temperature" is standard ambient temperature 25° C. or a temperature greater than or equal to about 10° C. to less than or equal to about 50° C., greater than or equal to about 15° C. to less than or equal to about 40° C., greater than or equal to about 20° C. to less than or equal to about 30° C., greater than or equal to about 22° C. to less than or equal to about 28° C., such as a temperature of about 10° C., about 15° C., about 20° C., about 25° C., about 30° C., about 35° C., about 40° C., about 45° C., or about 50° C. As a result of quenching to a temperature between Ms and Mf, the shaped steel object 40 comprises martensite and retained austenite.

Next, the method 30 comprises performing an optional tempering treatment. As used herein, "tempering" refers to reheating and cooling a hard pressed steel in order to stabilized retained austenite in the hard pressed steel, which enhances strength and ductility. The tempering treatment comprises transferring the shaped steel object to second oven or furnace 42 and heating the shaped steel object for a time period of greater than or equal to about 1 minute to less than or equal to about 120 minutes, or greater than or equal to about 5 minutes to less than or equal to about 60 minutes. In various embodiments, the heating comprises heating the shaped steel object 40 to a temperature of greater than or equal to about 150° C. to less than or equal to about 300° C. The method 30 also includes cooling the shaped steel object back to a temperature between Ms and Mf, such as to ambient temperature in various embodiments.

In some embodiments, the alloy composition is bare, but has not been preoxidized prior to the austenitizing the blank. In such embodiments, the method 30 optionally further comprises, prior to the austenitization, preoxidizing the alloy composition by heating the alloy composition to a temperature of greater than or equal to about 500° C. to less than or equal to about 600° C. for a time period of greater than or equal to about 1 minute to less than or equal to about 60 minutes in air or in a controlled environment comprising $N_2$ (gas). In various embodiments, the method 30 is free of at least one of a preoxidation step, and a descaling step (e.g., shot blasting).

Figure 3:
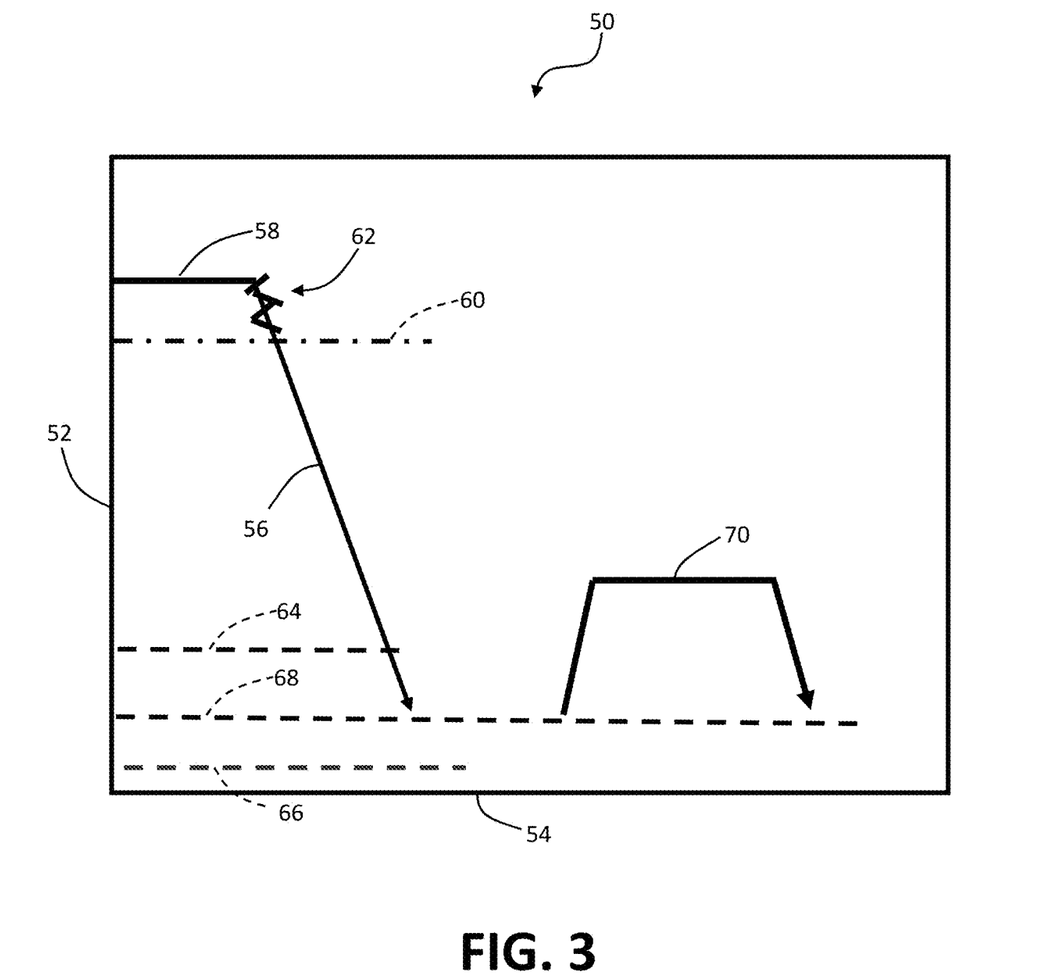
FIG. 3 is a graph showing a temperature profile used in a method of making a shaped steel object according to various aspects of the current technology.

The method 30 is further described in FIG. 3, which shows a graph 50 having a y-axis 52 representing temperature and an x-axis 54 representing time. A line 56 on the graph 50 is a cooling profile for an alloy composition. Here, the blank is austenitized, i.e., heated to a final temperature 58 that is above a critical transformation temperature ($A_{c3}$) 60 of the alloy composition. The final temperature 58, as described above, is greater than or equal to about 880° C. to less than or equal to about 1000° C., or greater than or equal to about 900° C. to less than or equal to about 950° C.

The austenitized blank is then stamped or hot formed into a stamped object in a press at a temperature 62 between the final temperature 58 and $A_{c3}$ 60. The stamped object is then quenched, i.e., cooled, at a constant quench rate of greater than or equal to about $5°$ $Cs^{-1}$ to less than or equal to about $300°$ $Cs^{-1}$, or great than or equal to about $60°$ $Cs^{-1}$ to less than or equal to about $100°$ $Cs^{-1}$ until the temperature decreases below a martensite start (Ms) temperature 64, but above a martensite final (Mf) temperature 66, such as to ambient temperature 68 (in some embodiments) to form a shaped steel object.

As discussed above, a result of quenching to a temperature between Ms and Mf, the shaped steel object comprises retained austenite, which provides beneficial properties as discussed further below. If quenching were to be performed to a temperature below Mf, the resulting shaped steel object would be about 100% martensite. Therefore, the amount of retained austenite in the shaped steel object is tunable. For example, a highest retained austenite content is achieved by quenching to a temperature near, but below Ms 64 and a lowest retained austenite content is achieved by quenching to a temperature near, but above Mf 66. As used herein, a temperature "near" Ms 64 or Mf 66 is a temperature within about 200° C. of Ms 64 or Mf 66. Therefore, the amount of retained austenite in the shaped steel object can be tuned or adjusted by quenching to a particular temperature between Ms 64 and Mf 66.

The optional tempering treatment then comprises heating the shaped steel object to a temperature a treatment temperature 70 of greater than or equal to about 150° C. to less than or equal to about 300° C. for a time period of greater than or equal to about 1 minute to less than or equal to about 120 minutes, or greater than or equal to about 5 minutes to less than or equal to about 60 minutes, as described above. Cooling the shaped steel object back to a temperature between Ms 64 and Mf 66, such as ambient temperature 68, completes the method. In some embodiments, the shaped steel object is painted and tempering treatment is performed simultaneously with a paint baking process during, for example, vehicle manufacture.

Shaped steel objects made by the above methods, also referred to herein as "hot stamped alloy", have a higher strength and a lower weight relative to an equivalent shaped steel object formed from 22MnB5, also referred to as "hot stamped 22MnB5". The higher strength is a result of the microstructure of the hot stamped alloy, which comprises greater than or equal to about 80 wt. % to less than or equal to about 95 wt. % martensite and greater than or equal to about 5 wt. % to less than or equal to about 20 wt. % retained austenite. Put another way, the microstructure of the hot stamped alloy has a martensite:retained austenite ratio of from about 4:1 to about 19:1. The tempering treatment stabilizes the retained austenite.

Figure 4:
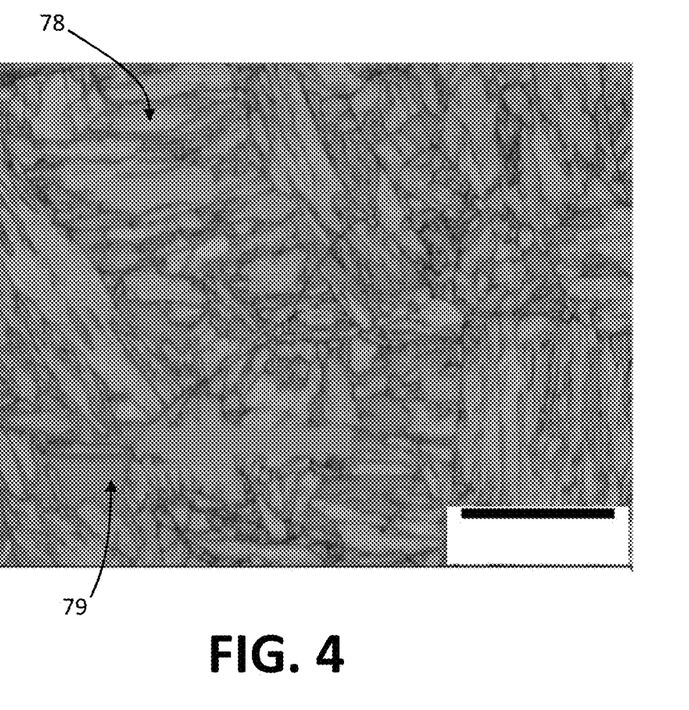
FIG. 4 shows an electron backscatter diffraction (EBSD) image of microstructures of a hot stamped alloy composition made according to various aspects of the current technology.

FIG. 4 shows an electron backscatter diffraction (EBSD) image of the microstructure of a hot stamped alloy made according to the current method. The image shows that the hot stamped alloy comprises martensite 78 and retained austenite 79. The scale bar is 5 μm.

Figure 5:
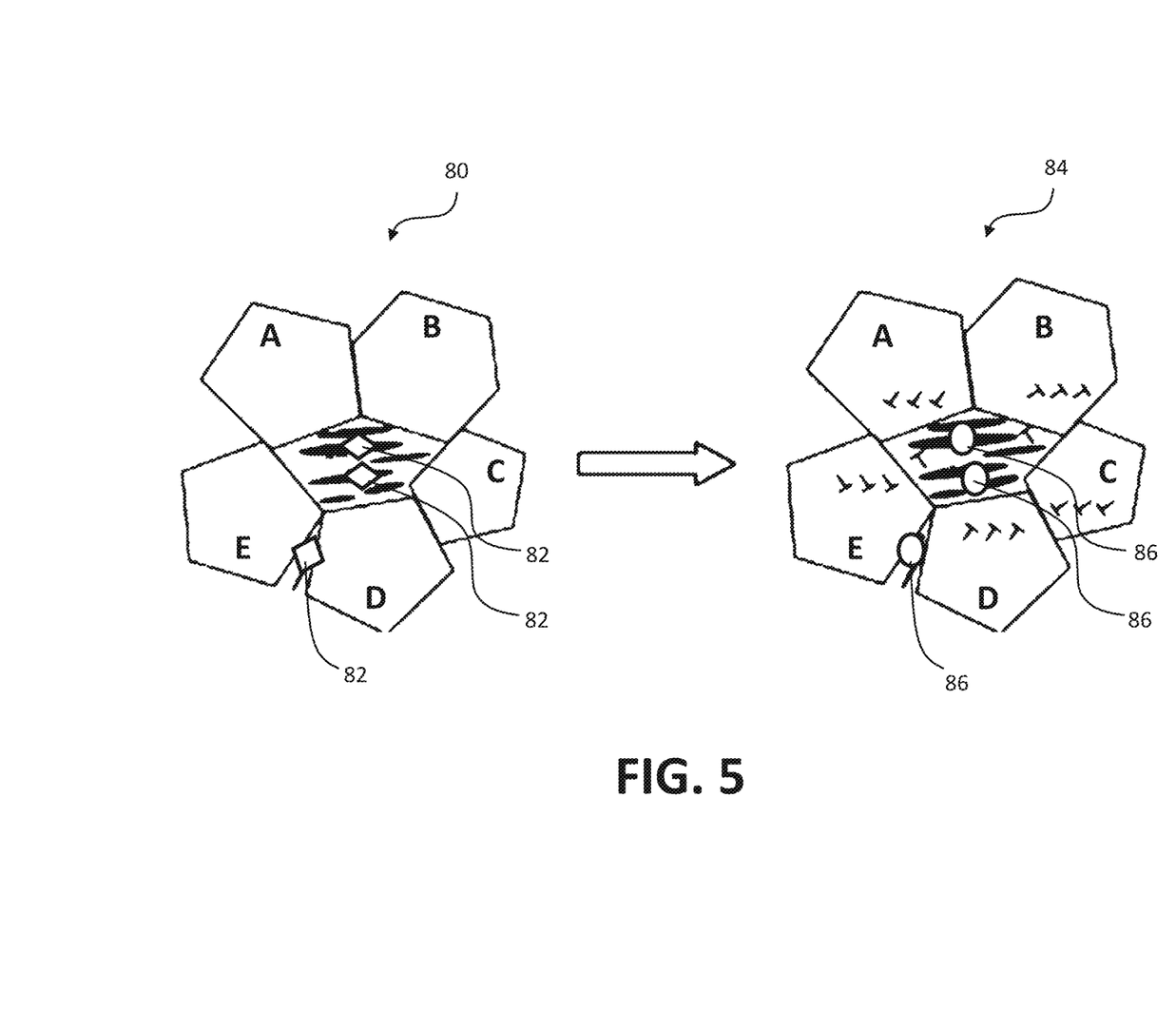
FIG. 5 is a graphic illustration that demonstrates transformation-induced plasticity.

The presence of retained austenite in the hot stamped alloy increases the UTS and ductility (elongation) relative to an equivalent hot stamped alloy of 22MnB5 steel due to transformation induced plasticity (TRIP). The TRIP is an effect in which retained martensite transforms into structure phase martensite upon application of a load or stress. An example of the TRIP effect is provided in FIG. 5. FIG. 5 shows a first microstructure 80 having grains A-E and retained austenite represented by diamonds 82 located between the grains A-E. When a load or stress is applied, as shown by the arrow, the first microstructure 80 transforms into a second microstructure 84, wherein the retained austenite 82 transforms into martensite represented by circles 86.

Due to the TRIP effect, the martensite:retained austenite ratio increases when a load or stress is applied to the hot stamped alloy. Because hot stamped 22MnB5 steel comprises about 100% martensite, it does not undergo the TRIP effect upon the application of a load or stress. Accordingly, at least partially due to the TRIP effect, the hot stamped alloy of the current technology has an increased strength relative to an equivalent hot stamped alloy of 22MnB5. The hot stamped alloy of the current technology has a UTS of greater than about 1500 MPa, greater than about 1600 MPA, or greater than about 1700 MPA, such as a UTS of greater than about 1500 MPa to less than or equal to about 2200 MPa, or greater than or equal to about 1800 MPa to less than or equal to about 2000 MPa. Also, the hot stamped alloy of the current technology has a ductility (elongation) of greater than or equal to about 7% to less than or equal to about 15%, or greater than or equal to about 10% to less than or equal to about 13%. Relative to an equivalent hot stamped object comprising 22MnB5 steel, the hot stamped alloy composition of the current technology has an increase in UTS of from greater than or equal to about 10% to less than or equal to about 35%, or greater than or equal to about 10% to less than or equal to about 15%.

Figure 6:
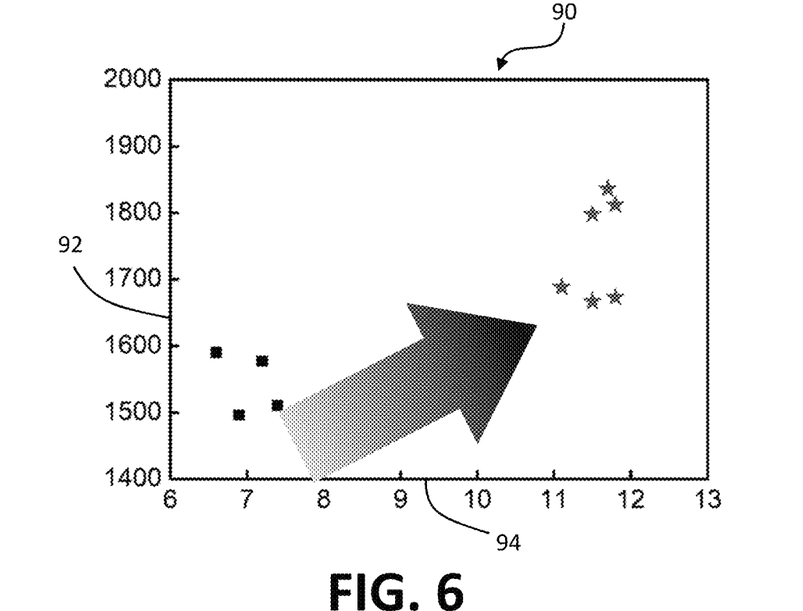
FIG. 6 is a graph of stress versus strain for hot stamped 22MnB5 and a hot stamped alloy composition according to various aspects of the current technology.

An example of the increased strength provided by the current alloy composition relative to 22MnB5 steel is shown in FIG. 6. In particular, FIG. 6 provides a graph 90 with a y-axis 92 corresponding to stress (MPa) and an x-axis 94 corresponding to strain (%). The hot stamped 22MnB5 is represented by squares and hot stamped alloy composition of the current technology is represented by stars. As shown by the block arrow, the strength and ductility (elongation) of the hot stamped alloy composition of the current technology are higher than the strength and ductility (elongation) of the hot stamped 22MnB5.

Figure 7:
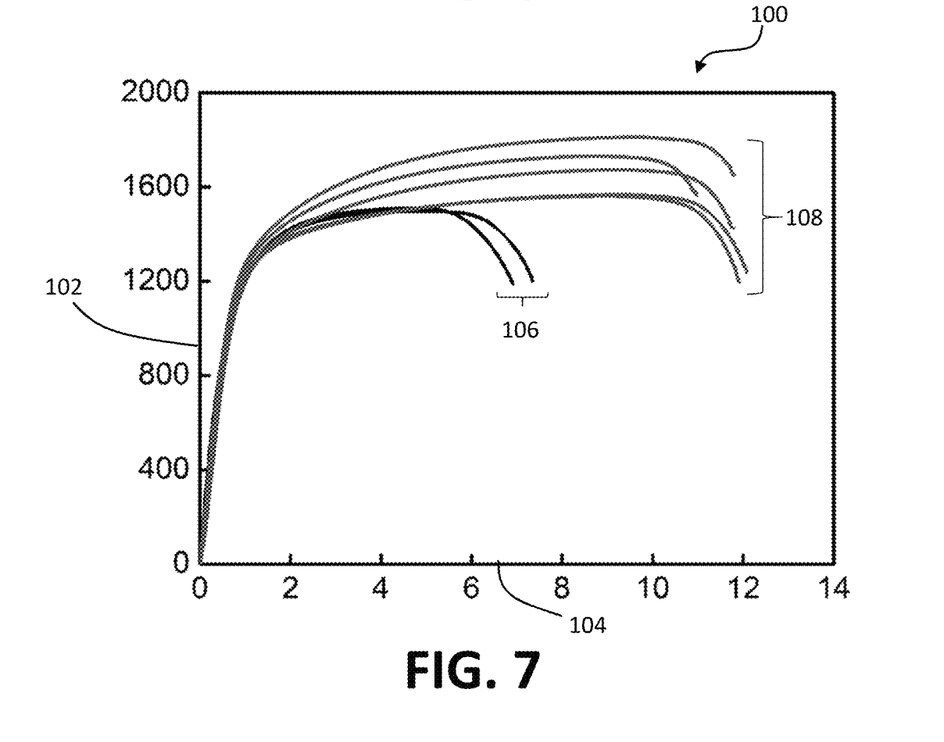
FIG. 7 is a graph of stress versus strain for hot stamped 22MnB5 and a hot stamped alloy composition according to various aspects of the current technology.

FIG. 7 provides another graph 100 having a y-axis 102 corresponding to stress (MPa) and an x-axis 104 corresponding to strain (%). First curves 106 from an object hot stamped from 22MnB5 and second curves 108 from an object hot stamped from the alloy composition according the current technology are shown on the graph 100. The graph 100 shows that the object hot stamped from the alloy composition according to the current technology has a higher strength and ductility relative to the object hot stamped from 22MnB5 steel.

The lower weight of the shaped steel object is in part due to the increased UTS. Because the shaped steel object has an increased strength relative to an equivalent object hot stamped from 22MnB5, thinner material can be used for a weight reduction of greater than or equal to about 15% to less than or equal to about 20%.

Figure 8:
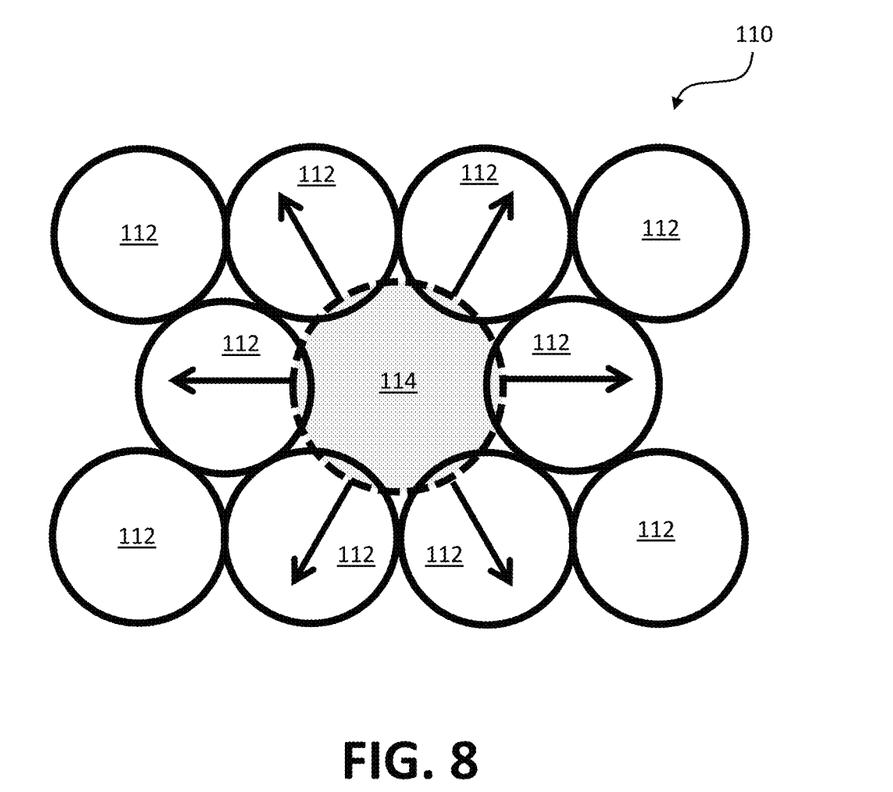
FIG. 8 is a graphic illustration demonstrating lattice dilation resulting from the addition of aluminum into an iron lattice.

The lower weight is also a result of a high Al concentration. Iron (Fe) has a density of about 7.86 g/cm$^3$ and aluminum (Al) has a density of about 2.7 g/cm$^3$. This difference accounts for a 1.3% density reduction per 1 wt. % Al included in the alloy composition. The high Al concentration of the alloy composition also results in lattice dilation. By replacing a portion of the Fe content with Al, leading to an increased amount of Al relative to 22MnB5, the lower density, but larger Al atoms occupy more lattice space than the heavier and denser Fe atoms. Therefore, a lattice will dilate when iron in the lattice is replaced by Al. An example of lattice dilation is provided in FIG. 8, which shows a lattice 110 comprising Fe atoms 112 shown as circles with solid borders. The lattice 110 is packed as if all the atoms are Fe. An aluminum atom 114 is shown as a shaded circle with a dashed border superimposed on a central Fe atom (not shown). When the central Fe atom is replaced by the Al atom 114, the spacing of the Fe atoms 112 in the lattice 110 is forced to dilate in order to accommodate the relatively larger Al atom 114. The increased amount of space occupied by Al relative to Fe also causes a weight reduction. Through this double mechanism provided by Al, i.e., lower density and lattice dilation, a weight reduction of greater than or equal to about 4% to less than or equal to about 11% relative to an equivalent hot stamped 22MnB5 is achieved.

Between the reduction of material that can be used relative to 22MnB5 due to its higher UTS and ductility (elongation) and the double effect provided by Al, the hot stamped object has a total weight decrease of greater than or equal to about 18% to less than or equal to about 28% relative an equivalent object hot stamped from 22MnB5.

The current technology further provides a shaped steel object made by the above method. The shaped steel object has a higher strength, a higher ductility, and a lower weight relative to a second shaped object that was hot stamped from 22MnB5. The shaped steel object may be part of an automobile or other vehicle as exemplified above.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method of forming a shaped steel object, the method comprising:
   cutting a blank from an alloy composition, the alloy composition comprising:
      carbon (C) at a concentration of greater than or equal to about 0.05 wt. % to less than or equal to about 0.5 wt. % of the alloy composition,
      manganese (Mn) at a concentration of greater than or equal to about 4 wt. % to less than or equal to about 12 wt. % of the alloy composition,
      aluminum (Al) at a concentration of greater than or equal to 2 wt. % to less than or equal to about 8 wt. % of the alloy composition,
      vanadium (V) at a concentration of greater than 0 wt. % to less than or equal to about 0.4 wt. % of the alloy composition, and
      a balance of the alloy composition being iron (Fe);
   heating the blank until the blank is austenitized;
   transferring the heated blank to a press;
   forming the heated blank into a predetermined shape defined by the press to generate a stamped object; and
   decreasing the temperature of the stamped object to a temperature between a martensite start (Ms) temperature of the alloy composition and a martensite final (Mf) temperature of the alloy composition to form a shaped steel object comprising martensite and retained austenite.

2. The method according to claim 1, wherein the alloy composition further comprises:
   zirconium (Zr) at a concentration of greater than 0 wt. % to less than or equal to about 0.5 wt. % of the alloy composition.

3. The method according to claim 2, wherein the alloy composition further comprises at least one of:
   nickel (Ni) at a concentration of greater than 0 wt. % to less than or equal to about 5 wt. % of the alloy composition,
   molybdenum (Mo) at a concentration of greater than 0 wt. % to less than or equal to about 0.5 wt. % of the alloy composition,
   niobium (Nb) at a concentration of greater than 0 wt. % to less than or equal to about 0.2 wt. % of the alloy composition,
   copper (Cu) at a concentration of greater than 0 wt. % to less than or equal to about 3 wt. % of the alloy composition,
   titanium (Ti) at a concentration of greater than 0 wt. % to less than or equal to about 0.1 wt. % of the alloy composition,
   nitrogen (N) at a concentration of greater than 0 wt. % to less than or equal to about 0.01 wt. % of the alloy composition, and
   boron (B) at a concentration of greater than 0 wt. % to less than or equal to about 0.005 wt. % of the alloy composition.

4. The method according to claim 1, wherein the Mn is at a concentration of greater than or equal to about 6 wt. % to less than or equal to about 10 wt. % and the Al is at a concentration of greater than or equal to 2 wt. % to less than or equal to about 5 wt. %.

5. The method according to claim 1, wherein the C is at a concentration of greater than or equal to about 0.1 wt. % to less than or equal to about 0.45 wt. %.

6. The method according to claim 1, wherein the alloy composition is in coil form.

7. The method according to claim 1, wherein the heating the blank comprises heating the blank to a temperature of greater than or equal to about 900° C. to less than or equal to about 950° C. for a time period of greater than or equal to about 1 minute to less than or equal to about 60 minutes.

8. The method according to claim 1, wherein the temperature between the Ms temperature of the alloy composition and the Mf temperature of the alloy composition is ambient temperature.

9. The method according to claim 1, wherein the decreasing the temperature comprises decreasing the temperature at a rate of greater than or equal to about 5 degrees Celsius per second to less than or equal to about 300 degrees Celsius per second.

10. The method according to claim 1, further comprising, prior to the heating the blank until the blank is austenitized:
    preoxidizing the alloy composition by heating the alloy composition to a temperature of greater than or equal to about 500° C. to less than or equal to about 600° C. for a time period of greater than or equal to about 1 minute to less than or equal to about 60 minutes.

11. The method according to claim 1, further comprising, after the decreasing the temperature:
    tempering the shaped steel object.

12. The method according to claim 11, wherein the tempering the shaped steel object comprises:
    heating the shaped steel object to a temperature greater than or equal to about 150° C. to less than or equal to about 300° C. for a time period of greater than or equal to about 1 minute to less than or equal to about 120 minutes, and
    cooling the shaped steel object to ambient temperature.

13. The method according to claim 1, wherein the shaped steel object has a higher strength and a lower weight relative to an equivalent shaped steel object formed from 22MnB5.

* * * * *